United States Patent
Zhang et al.

(10) Patent No.: US 11,511,768 B2
(45) Date of Patent: Nov. 29, 2022

(54) DEVICE AND METHOD FOR VIRTUALIZING DRIVING ENVIRONMENT, AND VEHICLE

(71) Applicant: Harman International Industries, Incorporated, Stamford, CT (US)

(72) Inventors: Guoxia Zhang, Shanghai (CN); Qingshan Zhang, Shanghai (CN)

(73) Assignee: Harman International Industries, Incorporated, Stamford, CT (US)

( * ) Notice: Subject to any disclaimer, the term of this patent is extended or adjusted under 35 U.S.C. 154(b) by 568 days.

(21) Appl. No.: 16/317,775

(22) PCT Filed: Jul. 15, 2016

(86) PCT No.: PCT/CN2016/090189
§ 371 (c)(1),
(2) Date: Jan. 14, 2019

(87) PCT Pub. No.: WO2018/010169
PCT Pub. Date: Jan. 18, 2018

(65) Prior Publication Data
US 2021/0229696 A1    Jul. 29, 2021

(51) Int. Cl.
*G06V 20/58*  (2022.01)
*B60W 60/00*  (2020.01)
*G06K 9/62*   (2022.01)

(52) U.S. Cl.
CPC ......... *B60W 60/001* (2020.02); *G06K 9/6288* (2013.01); *G06V 20/58* (2022.01);
(Continued)

(58) Field of Classification Search
CPC ......... B60W 60/001; B60W 2420/403; B60W 2554/4049; G06K 9/00805; G06K 9/6288;
(Continued)

(56) References Cited

U.S. PATENT DOCUMENTS

| | | | |
|---|---|---|---|
| 8,996,228 B1 | 3/2015 | Ferguson et al. | |
| 9,079,587 B1 * | 7/2015 | Rupp | B60W 40/06 |

(Continued)

FOREIGN PATENT DOCUMENTS

| | | |
|---|---|---|
| CN | 103359013 A | 10/2013 |
| CN | 103802729 A | 5/2014 |

(Continued)

OTHER PUBLICATIONS

"OctoMap: an efficient probabilistic 3D mapping framework based on octrees", Auton Robot (2013) 34:189-206 (2013) to Hornung et al. (Hornung). (Year: 2013).*

(Continued)

*Primary Examiner* — Kenneth J Malkowski
(74) *Attorney, Agent, or Firm* — McCoy Russell LLP

(57) ABSTRACT

A device for virtualizing a driving environment surrounding a first node, which includes: a data acquisition device, configured to acquire position data of the first node, position data and sensing data of at least one second node, where the at least one second node and the first node are in a first communication network; and a scene construction device, configured to construct a scene virtualizing the driving environment surrounding the first node based on the position data of the fist node and the at least one second node, and on the sensing data of the at least one second node. Accordingly, by utilizing position data and sensor data of a node, a scene for virtualizing a driving environment can be constructed in real time for a driver, which improves driving safety.

20 Claims, 7 Drawing Sheets

(52) U.S. Cl.
CPC ............... *B60W 2420/403* (2013.01); *B60W 2554/4049* (2020.02)

(58) Field of Classification Search
CPC ............... G05D 1/0289; G05D 1/0276; G01S 2013/9316; G01C 21/28; G08G 1/161; G08G 1/096791
See application file for complete search history.

(56) References Cited

U.S. PATENT DOCUMENTS

| | | |
|---|---|---|
| 2012/0268262 A1 | 10/2012 | Popovic |
| 2014/0012492 A1 | 1/2014 | Bowers et al. |
| 2014/0359552 A1 | 12/2014 | Misra et al. |
| 2014/0379247 A1 | 12/2014 | Ferguson et al. |
| 2015/0241880 A1 | 8/2015 | Kim et al. |
| 2016/0205656 A1* | 7/2016 | Zeng ............... G01S 19/51 455/456.1 |

FOREIGN PATENT DOCUMENTS

| | | |
|---|---|---|
| CN | 103891201 A | 6/2014 |
| CN | 104843001 A | 8/2015 |
| CN | 105358399 A | 2/2016 |
| JP | H09319302 A | 12/1997 |

OTHER PUBLICATIONS

European Patent Office, Extended European Search Report Issued in Application No. 16908494.4, dated Dec. 5, 2019, Germany, 8 pages.

ISA State Intellectual Property Office of the People's Republic of China, International Search Report and Written Opinion Issued in Application Serial No. PCT/CN2016/090189, WIPO, dated Apr. 21, 2017, 12 pages.

State Intellectual Property Office of the People's Republic of China, Office Action and Search Report Issued in Application No. 201680087334.4, dated May 24, 2021, 23 pages. (Submitted with Partial Translation).

\* cited by examiner

DEVICE AND METHOD FOR VIRTUALIZING DRIVING ENVIRONMENT, AND VEHICLE

CROSS REFERENCE TO RELATED APPLICATIONS

The present application is a U.S. National Phase of International Patent Application Serial No. PCT/CN2016/090189, entitled "DEVICE AND METHOD FOR VIRTUALIZING DRIVING ENVIRONMENT, AND VEHICLE," and filed on Jul. 15, 2016. The entire contents of the above-mentioned application are hereby incorporated by reference for all purposes.

TECHNICAL FIELD

The present disclosure relates to driver assistances, and more particularly, to a device and a method for virtualizing a driving environment, and a vehicle including a device for virtualizing a driving environment.

BACKGROUND

Knowledge of driving environment is advantageous to drivers and autonomous driving. Through on-board sensors (e.g., radar, lidar, camera, etc.), knowledge of objects adjacent to a vehicle can be acquired by the vehicle. However, sensing data could be incomplete or inaccurate. For example, a blocked object could be missed by the on-board sensors, or a ghost object could be generated by the on-board sensors. Currently, in order to solve this problem, the sensing data are exchanged between vehicles via an inter-vehicle communication network for sharing knowledge of driving environment such as position of a stationary or moving object, velocity of a moving object, etc. Nevertheless, the shared knowledge of driving environment is abstract and limited. Therefore, there is a need for a method and a device to know driving environment.

SUMMARY

Embodiments of the present disclosure provide a device for virtualizing a driving environment surrounding a first node, which may include: a data acquisition device, configured to acquire position data of the first node, position data and sensing data of at least one second node, where the at least one second node and the first node are in a first communication network; and a scene construction device, configured to construct a scene virtualizing the driving environment surrounding the first node based on the position data of the fist node and the at least one second node, and on the sensing data of the at least one second node.

In some embodiments, the device may further include: a decompression device configured to decompress the sensing data of the at least one second node.

In some embodiments, the scene construction device may include: a topology construction device, configured to construct a topology including position coordinates of the at least one second node relative to a position coordinate of the first node, based on the position data of the first node and the at least one second node; and an image construction device, configured to identify sensing data for objects in the driving environment based on the sensing data of the at least one second node and the topology, and to fuse the identified sensing data to construct the objects and to construct a scene virtualizing the driving environment surrounding the first node based on the constructed objects and the topology.

In some embodiments, the data acquisition device may be further configured to acquire sensing data of the first node that contains information of objects adjacent to the first node, and the image construction device is further configured to identify sensing data for objects in the driving environment based on the sensing data of the first node and the at least one second node, and to fuse the identified sensing data to construct the objects and to construct a scene virtualizing the driving environment surrounding the first node based on the constructed objects and the topology.

In some embodiments, the data acquisition device may be further configured to acquire position data of at least one third node that is not within the first communication network but is within a second communication network together with a part of the at least one second node, and the topology construction device is further configured to construct a topology including position coordinates of the at least one second node and the at least one third node relative to the position coordinate of the first node, where the position data of the at least one third node is obtained from the part of the at least one second node.

In some embodiments, the data acquisition device may be further configured to acquire sensing data of the at least one third node, and the image construction device is further configured to identify sensing data for objects in the driving environment based on the sensing data of the at least one second node and the at least one third node, and to fuse the identified sensing data to construct the objects and to construct a scene virtualizing the driving environment surrounding the first node based on the constructed objects and the topology.

In some embodiments, the sensing data may be compressed and include a node identification and a data set including position data, velocity data, size data or shape data for objects detected.

In some embodiments, the sensing data may be compressed and include multiple data sets each including two sets of coordinates representing two ends of an edge of an object detected and an index of layer. In some embodiments, each of the multiple data sets may further include intensity data or speed data.

In some embodiments, the sensing data may be acquired in response to a request or through broadcast.

In some embodiments, the position data may be acquired based on GPS data transmitted using a basic safety message or a cooperative awareness message.

In some embodiments, the device for constructing a scene virtualizing the driving environment may be configured to be refreshed at least every 1 millisecond.

The embodiments of the present disclosure further provide a method for virtualizing a driving environment surrounding a first node, which may includes: acquiring position data of the first node, position data and sensing data of at least one second node, where the at least one second node and the first node are in a first communication network; and constructing a scene virtualizing the driving environment surrounding the first node based on the position data of the first node and the at least one second node, and on the sensing data of the at least one second node.

In some embodiments, the sensing data of the at least one second node may be compressed, and before constructing the scene virtualizing the driving environment, the method may further include: decompressing the sensing data of the at least one second node.

In some embodiments, constructing a scene virtualizing the driving environment may include: constructing a topology including position coordinates of the at least one second node relative to a position coordinate of the first node, based on the position data of the first node and the at least one second node; identifying sensing data for objects in the driving environment based on the sensing data of the at least one second node and the topology; fusing the identified sensing data to construct the objects; and constructing a scene virtualizing the driving environment surrounding the first node based on the constructed objects and the topology.

In some embodiments, the method may further include: acquiring sensing data of the first node which contains information of objects adjacent to the first node. In some embodiments, constructing a scene virtualizing the driving environment may include: constructing a topology including position coordinates of the at least one second node relative to a position coordinate of the first node, based on the position data of the first node and the at least one second node; identifying sensing data for objects in the driving environment based on the sensing data of the first node and the at least one second node; fusing the identified sensing data to construct the objects; and constructing a scene virtualizing the driving environment surrounding the first node based on the constructed objects and the topology.

In some embodiments, the method may further include: acquiring position data of at least one third node that is not within the first communication network but is within a second communication network together with a part of the at least one second node, where the position data of the at least one third node is obtained from the part of the at least one second node.

In some embodiments, constructing a scene virtualizing the driving environment may include: construct a topology including position coordinates of the at least one second node and the at least one third node relative to a position coordinate of the first node based on the position data of the at least one second node and at least one third node.

In some embodiments, the method may further include: acquiring sensing data of the at least one third node.

In some embodiments, constructing a scene virtualizing the driving environment may further include: identifying sensing data for objects in the driving environment based on the sensing data of the at least one second node and the at least one third node; fusing the identified sensing data to construct the objects; and constructing a scene virtualizing the driving environment surrounding the first node based on the constructed objects and the topology.

In some embodiments, the sensing data may be compressed and include a node identification and a data set including position data, velocity data, size data or shape data for objects detected.

In some embodiments, the sensing data may be compressed and include multiple data sets each including two sets of coordinates representing two ends of an edge of an object detected and an index of layer. In some embodiments, each of the multiple data sets may further include intensity data or speed data.

In some embodiments, the sensing data may be acquired in response to a request or through broadcast.

In some embodiments, the position data may be acquired based on GPS data transmitted through a basic safety message or a cooperative awareness message.

In some embodiments, a scene virtualizing the driving environment may be refreshed at least every 1 millisecond.

The embodiments of the present disclosure further provide a method for transmitting sensing data from a vehicle, which may include: obtaining sensing data of objects detected by a sensor mounted on the vehicle; compressing the sensing data of objects; and transmitting the compressed sensing data. In some embodiments, the sensor may be a lidar.

The embodiments of the present disclosure further provide a vehicle, which may include: a GPS; a sensor, adapted to detect at least one object adjacent to the vehicle to obtain sensing data; and the device for virtualizing the driving environment described above. In some embodiments, the GPS may be a real-time kinetic system. In some embodiments, the sensor may be a lidar.

In some embodiments, the vehicle may further include: a compressor adapted to compress the sensing data.

In some embodiments, the vehicle may further include: a transmitter adapted to transmit the compressed sensing data.

By utilizing position data and sensor data of a node, a scene for virtualizing a driving environment can be constructed in real time for a driver, which improves driving safety.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered as limitation to its scope, the disclosure will be described with additional specificity and detail through use of the accompanying drawings.

DETAILED DESCRIPTION

Figure 1:
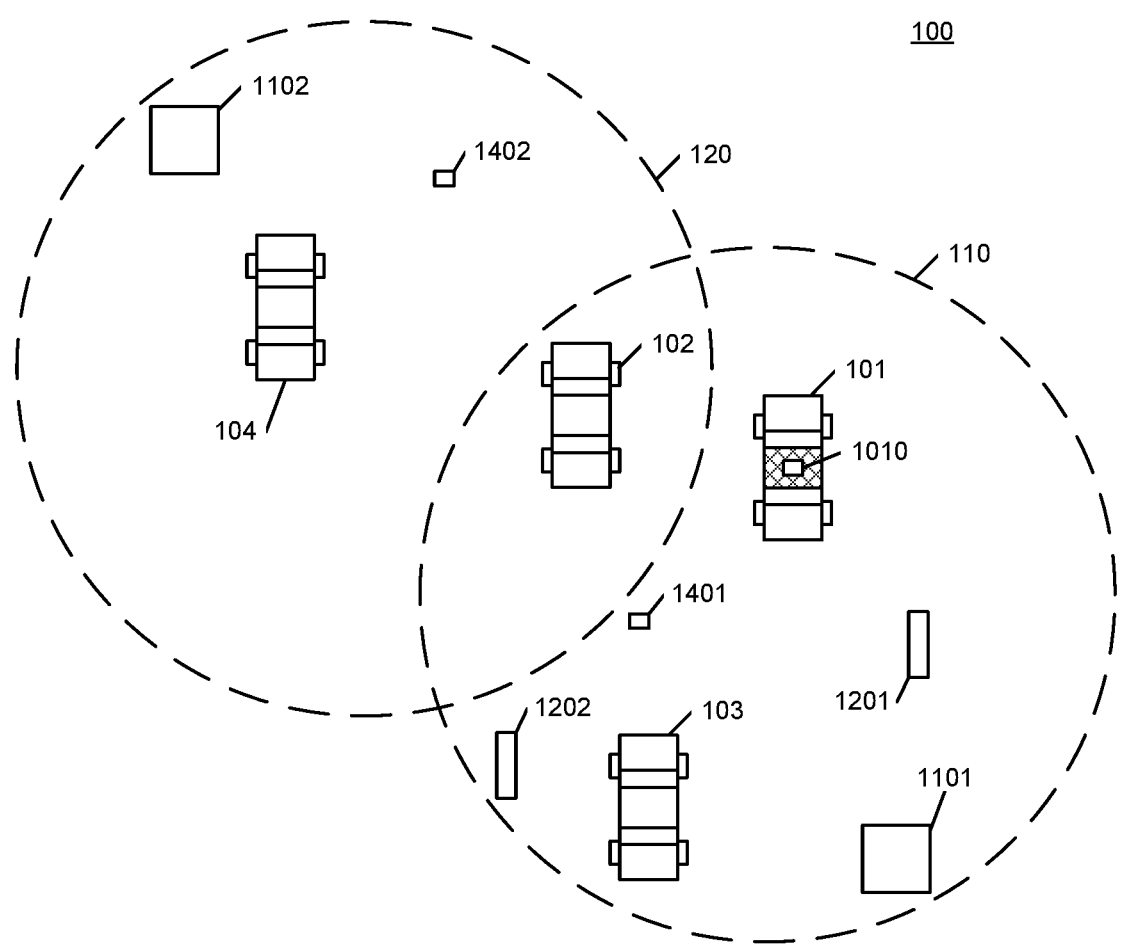
FIG. 1 schematically illustrates an exemplified actual driving environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limitation. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Typically, there may be multiple nodes in an actual driving environment. The multiple nodes may include a vehicle, a mobile communication device, a stationary communication device, etc., and at least a portion of the multiple nodes includes a GPS and a sensor (e.g., a lidar).

FIG. 1 schematically illustrates an exemplified actual driving environment 100. The environment 100 includes a first car 101, a second car 102, a third car 103, a fourth car 104, two stationary objects 1101 and 1102 that each may be a tree, a pedestrian island, a standing person, etc., two motorcycles 1201 and 1202, and two moving persons 1401 and 1402. The first car 101, the second car 102, the third car 103 and the fourth car 104 each are mounted with a GPS and a lidar.

The first car 101 can communicate with the second car 102 and the third car 103, thus the first car 101, the second car 102 and the third car 103 belong to an inter-vehicle communication network 110, such as a Dedicated Short Range Communication (DSRC) network. The fourth car 104 can communicate with the second car 102 but can not communicate with the first car 101, thus the fourth car 104 does not belong to the inter-vehicle communication network 110 but belong to an inter-vehicle communication network 120 including the second car 102 and the fourth car 104. As an example, the first car 101 carries a device for virtualizing a driving environment 1010.

Figure 2:
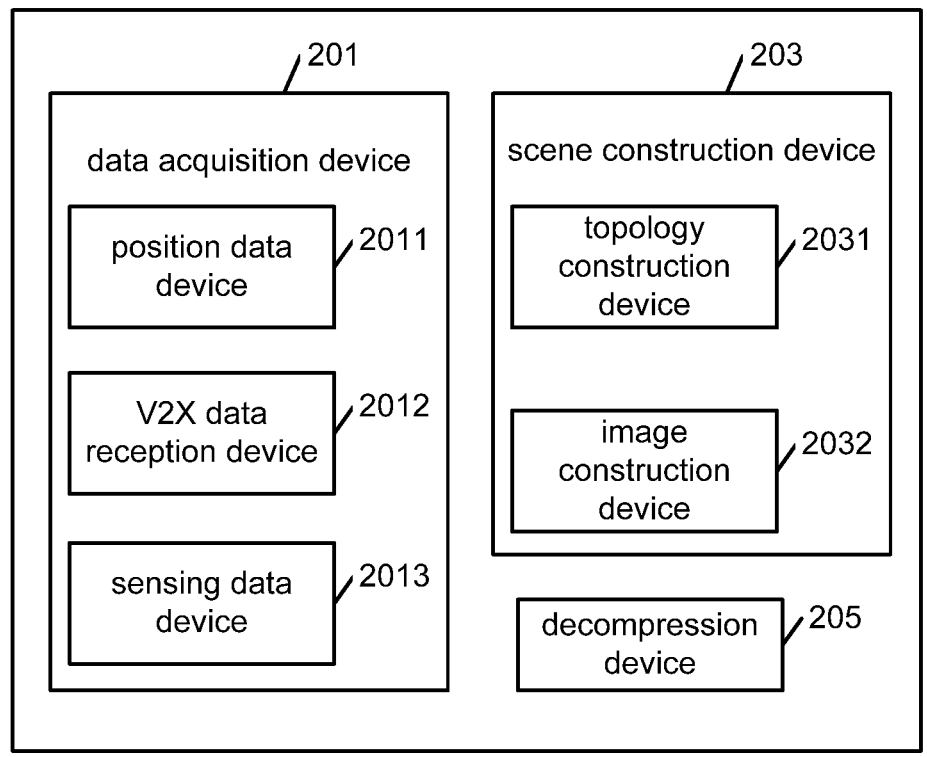
FIG. 2 schematically illustrates a structural diagram for the device for virtualizing a driving environment as shown in FIG. 1 according to an embodiment in the present disclosure.

FIG. 2 schematically illustrates a structural diagram for the device for virtualizing a driving environment 1010 as shown in FIG. 1 according to an embodiment in the present disclosure. The device for virtualizing a driving environment 1010 at least includes a data acquisition device 201, which includes a position data device 2011, a Vehicle to X (V2X) data reception device 2012, a sensing data device 2013. The device for virtualizing a driving environment 1010 further includes a scene construction device 203, where the scene construction device 203 includes a topology construction device 2031, and an image construction device 2032.

Referring to FIG. 1, the position data device 2011 is configured to acquire position data of the first car 101. The V2X data reception device 2012 is configured to acquire position data from cars in a same communication network, namely, from both the second car 102 and the third car 103. The sensing data device 2013 is configured to acquire sensing data from a sensing device mounted on a car. In some embodiments, the sensing device may be a lidar.

In some embodiments, the position data of the first car 101, and the position data from both the second car 102 and the third car 103 may be acquired based on data of a GPS or a high-precision GPS such as the Real-Time Kinematic (RTK) system. The GPS-RTK can precisely locate an accurate position of a car. In some embodiments, the position data of the first car 101 may be the GPS data or the high-precision GPS data.

In some embodiments, the position data of the first car 101, and the position data from both the second car 102 and the third car 103 may contain identity information of a car carrying the GPS or the high-precision GPS.

In some embodiments, the GPS data may be transmitted within a communication network via a Basic Safety Message (BSM) or a Cooperative Awareness Message (CAM), and besides the GPS data, the BSM or CAM may further include speed data and heading data.

In some embodiments, a car in the communication network can broadcast position data of the car and also broadcast position data of another car communicating with the car, such as the position data from the second car 102 may include position data of the second car 102, and may further include position data of the first car 101 and the fourth car 104.

The sensing data from both the second car 102 and the third car 103 may be compressed data. In some embodiments, the sensing data from the second car 102 may include sensing data of the second car 102 and may further include sensing data received from the fourth car 104.

In some embodiments, the sensing data from both the second car 102 and the third car 103 may be transmitted to the first car 101 in response to a request by the first car 101. In some embodiments, the sensing data from both the second car 102 and the third car 103 may be respectively broadcasted by the second car 102 and the third car 103.

Figure 3:
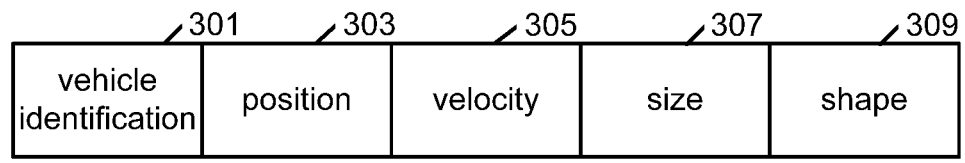
FIG. 3 schematically illustrates a structural diagram for a data structure of sensing data according to an embodiment in the present disclosure.

FIG. 3 schematically illustrates a structural diagram for a data structure of sensing data according to an embodiment in the present disclosure. Referring to FIG. 3, the sensing data from a car may include a vehicle identification 301 and a data set including position data 303, velocity data 305, size data 307 and shape data 309 for an object. Specifically, the vehicle identification 301 is an identification of a vehicle detecting an object. For example, referring to FIG. 1, the third car 103 detects the motorcycle 1201, thus the vehicle identification 301 is "103" in this case. The position data 303 represents a relative position of the object from the vehicle detecting the object. For example, further referring to FIG. 1, the motorcycle 1201 is located at northeast from the third car 103, thus the position data 303 represents a position located at northwest from the third car 103. The velocity data 305 represents both speed and heading of the object. The size data 307 represents length or width of the object. And, the shape data 309 represents shape of the object. In some embodiments, a digit "1" denotes a car, a digit "2" denotes a motorcycle and a digit "3" denotes a moving person, thus for the motorcycle 1201 as shown in FIG. 1, the shape data 309 is 2.

Figure 4:
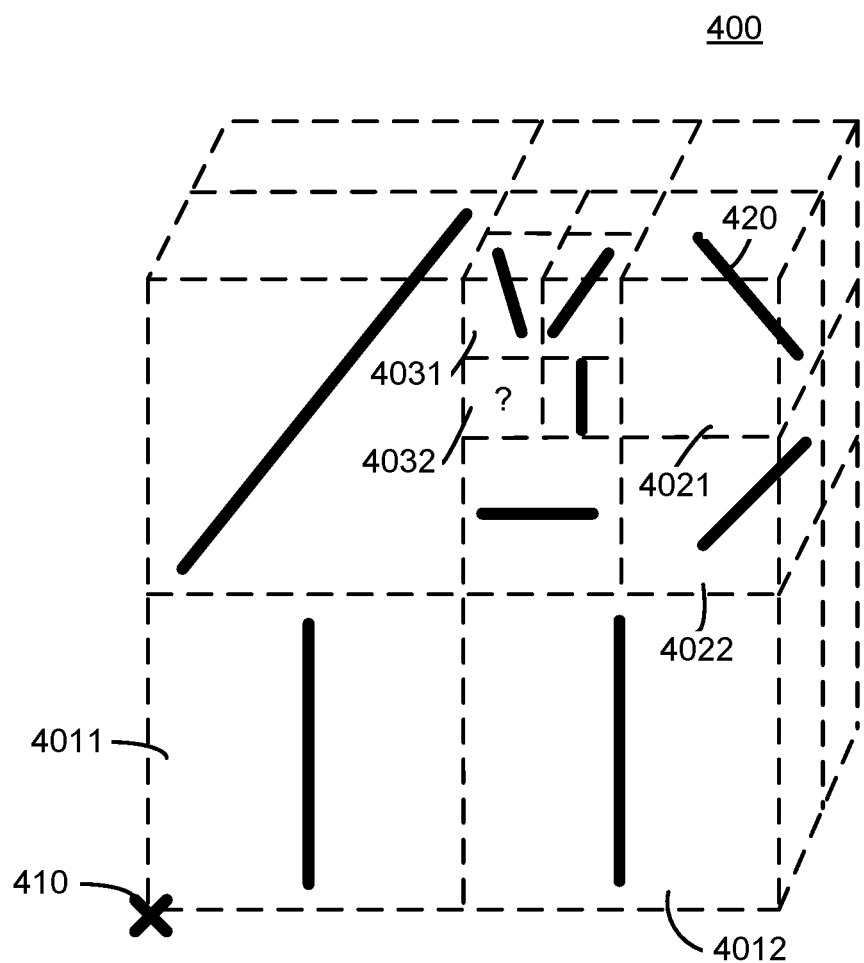
FIG. 4 schematically illustrates a diagram for a data space for sensing data according to another embodiment in the present disclosure.

FIG. 4 schematically illustrates a structural diagram for a data space for sensing data according to another embodiment in the present disclosure. Referring to FIG. 4, a cube 400 represents a three-dimensional coordinate system with an origin 410. The cube 400 may virtually represent a driving environment in a three-dimensional scale, and multiple nodes in the driving environment share the cube 400 and the origin 410. Referring to FIG. 1, multiple objects in the driving environment 100 are virtually included in the cube 400, and the multiple nodes agree on that position of the stationary object 1101 is the origin 410. Thus, positions of other objects, such as the stationary object 1102, the motorcycle 1202, the moving person 1402, etc., are relative positions from the origin 410 in the cube 400.

Further referring to FIG. 4, the cube 400 may be recursively divided into eight sub-cubes. Specifically, the cube 400 is divided into eight first-layer sub-cubes such as sub-cubes 4011 and 4012, a first-layer sub-cube may be then divided into eight second-layer sub-cubes such as sub-cubes 4021 and 4022, and a second-layer sub-cube may be then divided into eight third-layer sub-cubes such as sub-cubes 4031 and 4032. In some embodiments, for an object, a number of layers may be related to a resolution required for successfully identifying the object. For an example of an object with a large size and a simple shape such as a building, a lower resolution is required to identify the object so that a smaller number of layers is required. For an example of an object with a small size and a complex shape such as a bicycle, a higher resolution is required to identify the object so that a larger number of layers is required. In some embodiments, a number of layers for multiple objects may be related to a highest resolution required among the multiple objects. In some embodiments, the number of layers for an object or multiple objects may be set by a user custom action, where the number of layers may be set to be a specific value.

Further referring to FIG. 4, for an object in a driving environment, two ends of an edge of the object may be represented by two sets of coordinates in a sub-cube, thus a line segment formed by the two sets of coordinates in the sub-cube represents the edge of the object. If length of an edge is too long to be included in a lower layer sub-cube, a higher layer sub-cube is required to include two sets of coordinates representing two ends of the edge. For example, as shown in FIG. 4, a sub-cube with a size and an index of layer same as the sub-cube 4031 or 4032 is too small to include a line segment 420, thus a higher layer sub-cube that is the sub-cube 4021 is used to include the line segment 420. Therefore, besides the two sets of coordinates representing two ends of an edge of an object, the edge may be represented further by an index of layer, thus the two sets of coordinates and the index of layer formed a data set representing the edge. In this case, sensing data exchanged in a network includes multiple data sets. In some embodiments, the data set may further include intensity data or speed data. Therefore, since less 3D coordinate is used to represent an edge of an object, less sensing data is transmitted in a network, which results in overhead reduction for the network.

In some embodiments, referring to FIG. 2, the device for virtualizing a driving environment 1010 may further include a decompression device 205 adapted to decompress sensing data acquired from a car.

The scene construction device 203 is configured to construct a scene virtualizing the driving environment 100 based on the position data of the first car 101, the position data and the sensing data from the second car 102 and the third car 103.

Specifically, the topology construction device 2031 is configured to construct a topology including a position coordinate of the second car 102 relative to a position coordinate of the first car 101 and a position coordinate of the third car 103 relative to the position coordinate of the first car 101, which may be computed based on the position data of the first car 101 and the position data from the second car 102 and the third car 103. In some embodiments, the topology may further include a position coordinate of the fourth car 104 relative to the position coordinate of the first car 101.

Figure 5:
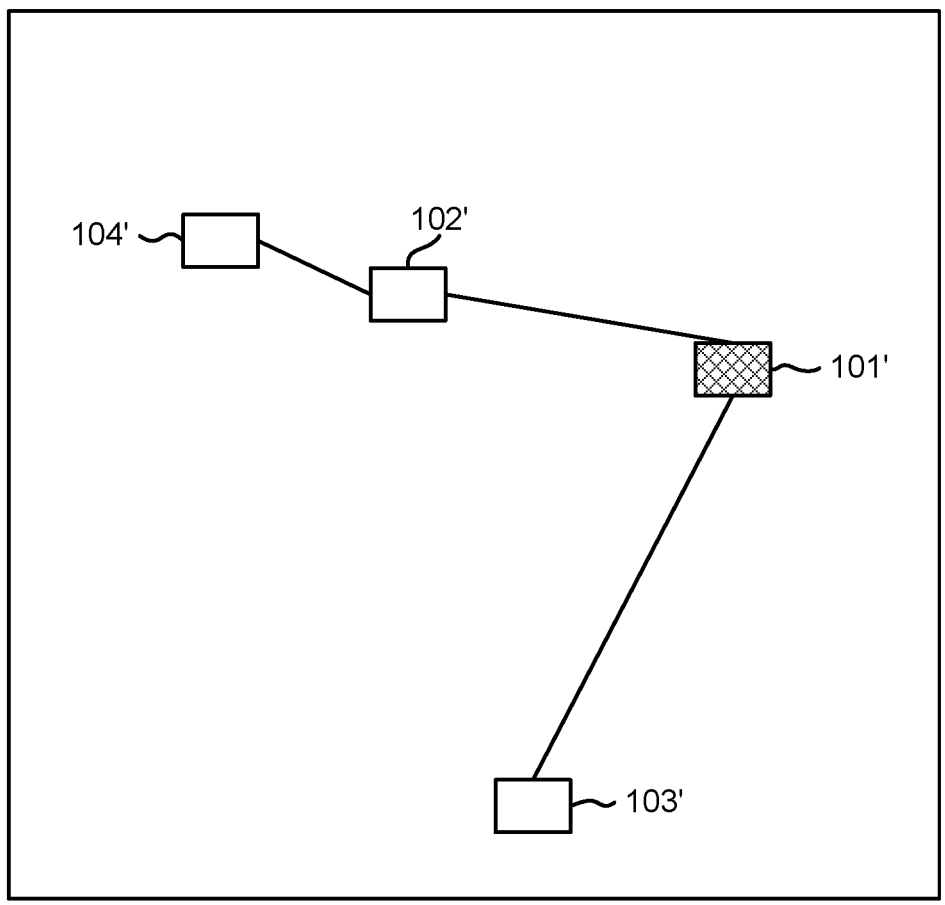
FIG. 5 schematically illustrate a topology corresponding to the multiple cars as shown in FIG. 1.

FIG. 5 schematically illustrate a topology 100' corresponding to the multiple cars as shown in FIG. 1. Referring to FIG. 5 in conjunction with FIG. 1, a first node 101' corresponding to the position coordinate of the first car 101 is connected to a second node 102' corresponding to the position coordinate of the second car 102 and a third node 103' corresponding to the position coordinate of the third car 103 separately, and moreover, the second node 102' is connected to a fourth node 104' corresponding to the position coordinate of the fourth car 104.

The image construction device 2032 is configured to analyze the sensing data from the second car 102 and the third car 103. Taking the moving person 1401 as an example, the sensing data from the second car 102 and the third car 103 both include sensing data of the moving person 1401, and the image construction device 2032 identifies the sensing data of the moving person 1401 from the sensing data from the second car 102 and the third car 103 based on analyzing position data, speed data, heading data, size data or shape data individually or in combination. For example, the image construction device 2032 acquires first data that a first moving person is located at southeast from the second car 102, and further acquires second data that a second moving person is located at north from the third car 103, thus the image construction device 2032 determines the first moving person and the second moving person are same based on the first data, second data and the position coordinates of the second car 102 and the third car 103. For another example, the image construction device 2032 acquires first shape data for a first object from the second car 102, and further acquires second shape data for a second object from the third car 103, thus the image construction device 2032 determines the first object and the second object are same based on analyzing the first shape data and the second shape data using a well-known method to the ordinarily skilled person. After analyzing the sensing data from the second car 102 and the third car 103, the image construction device 2032 fuses the identified sensing data to acquire multiple images for multiple virtualized objects to construct the scene based on the topology and the multiple images.

In some embodiments, the scene virtualizing the driving environment 100 includes a virtualized first car corresponding to the first car 101, a virtualized second car corresponding to the second car 102, a virtualized third car corresponding to the third car 103, a virtualized fourth car corresponding to the fourth car 104, two virtualized stationary objects corresponding to the two stationary objects 1101 and 1102 respectively, two virtualized motorcycles corresponding to the two motorcycles 1201 and 1202 respectively, and two virtualized moving persons corresponding to the two moving persons 1401 and 1402 respectively. Thus, the multiple virtualized objects correspond to the multiple objects in the driving environment 100.

In some embodiments, the virtualized scene may be refreshed frequently. In some embodiments, the scene may be refreshed at least every 1 ms.

In some embodiments, the scene construction device 203 constructs a scene virtualizing the driving environment 100 based on the sensing data of the second car 102 and the third car 103. In some embodiments, the scene construction device 203 constructs a scene virtualizing the driving environment 100 based on the sensing data of the first car 101, the second car 102 and the third car 103. In some embodiments, the scene construction device 203 constructs a scene virtualizing the driving environment 100 based on the sensing data of the second car 102, the third car 103 and the fourth car 104.

Figure 6:
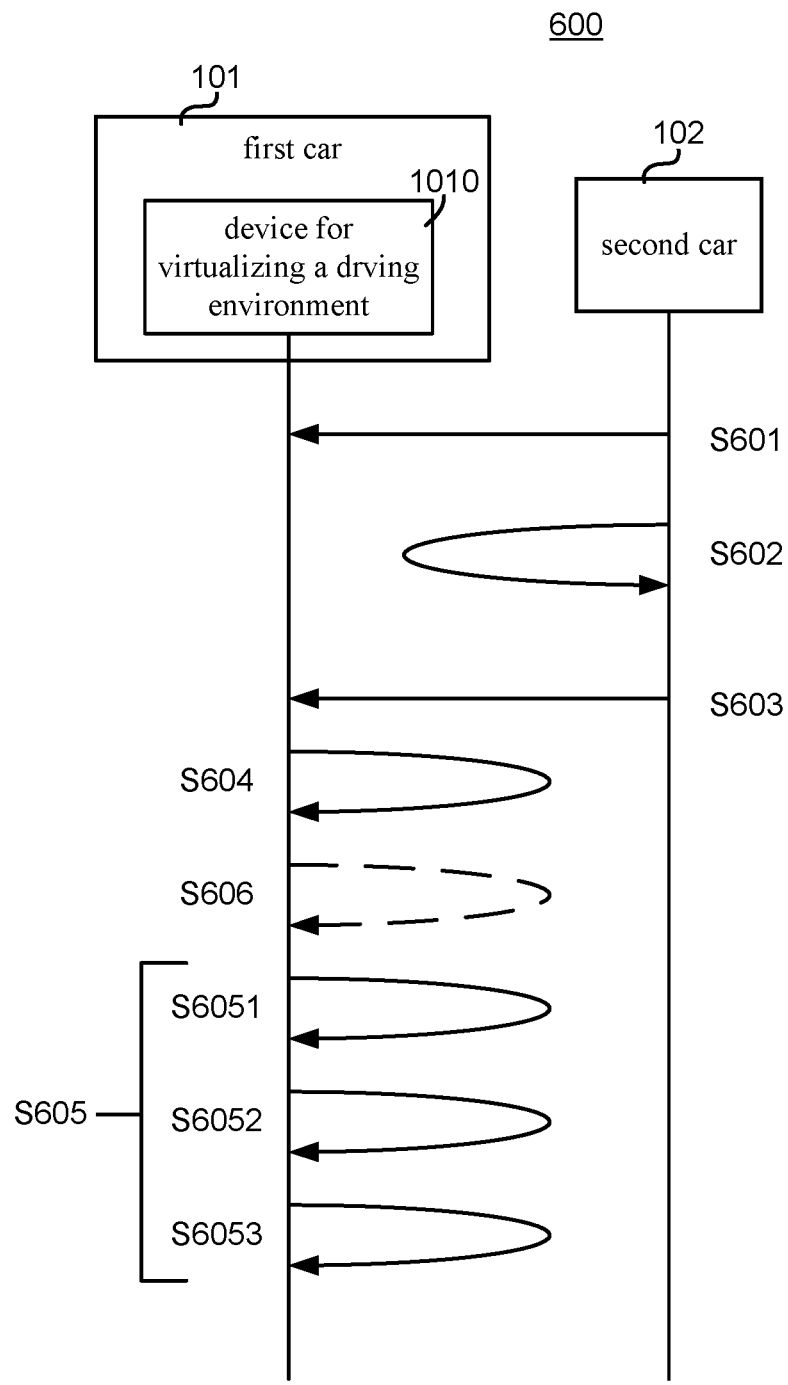
FIG. 6 schematically illustrates a flow diagram for a method for virtualizing a driving environment according to an embodiment in the present disclosure.

The embodiments of the present disclosure further provide a method for virtualizing a driving environment. FIG. 6 schematically illustrates a flow diagram for a method for virtualizing a driving environment 600 according to an embodiment in the present disclosure.

In S601, the second car 102 transmits position data to the first car 101. In some embodiments, the position data may be acquired based on the high-precision GPS data such as the GPS-RTK data. In some embodiments, the position data may include position data of the second car 102. In some embodiments, the position data may include position data of the second car 102 and the fourth car 104.

In some embodiments, the GPS data may be transmitted within a communication network via the BSM or the CAM, and besides the GPS data, the BSM or CAM may further include speed data and heading data.

In S602, the second car 102 compresses sensing data of the second car 102. In some embodiments, the sensing data of the second car 102 may be acquired through a lidar mounted on the second car 102.

In S603, the second car 102 transmits the compressed sensing data of the second car 102 to the first car 101. In some embodiments, the second car 102 may transmit the compressed sensing data of the second car 102 to the first car 101 in response to a request by the first car 101. In some embodiments, the second car 102 may broadcast the compressed sensing data of the second car 102.

In some embodiments, referring to FIG. 3, sensing data transmitted by the second car 102 may include the vehicle identification 301 and the data set including the position data 303, the velocity data 305, the size data 307 and the shape data 309 for an object.

In some embodiments, for an object in a driving environment, two ends of an edge of the object may be represented by two sets of coordinates in a sub-cube, thus a line segment formed by the two sets of coordinates in the sub-cube represents the edge of the object. Besides the two sets of coordinates representing two ends of an edge of an object, the edge may be represented further by an index of layer, thus the two sets of coordinates and the index of layer formed a data set representing the edge. In this case, the sensing data transmitted by the second car 102 includes multiple data sets. In some embodiments, the data set may further include intensity data or speed data.

In S604, the device for virtualizing a driving environment 1010 mounted on the first car 101 acquires position data of the first car 101, the position data and the sensing data transmitted by the second car 102. In some embodiments, the position data of the first car 101 may be acquired based on the GPS data or the high-precision GPS data. In some embodiments, the position data of the first car 101 may be the GPS data or the high-precision GPS data.

In some embodiments, the method 600 may further include S606 and, in S606, the device for virtualizing a driving environment 1010 decompresses the sensing data transmitted by the second car 102.

In S605, the device for virtualizing a driving environment 1010 constructs a scene virtualizing the driving environment 100 based on the position data of the first car 101, the position data and the sensing data transmitted by the second car 102. Wherein, the scene includes multiple virtualized objects corresponding to the multiple objects in the driving environment 100. In some embodiments, the device for virtualizing a driving environment 1010 constructs a scene virtualizing the driving environment 100 further based on sensing data of the first car 101.

In some embodiments, the scene may be refreshed frequently. In some embodiments, the scene may be refreshed at least every 1 ms.

In some embodiments, S605 may include S6051 that the device for virtualizing a driving environment 1010 constructs a topology at least including the position coordinate of the second car 102 relative to the position coordinate of the first car 101. In some embodiments, the topology may further include the position coordinate of the fourth car 104 relative to the position coordinate of the first car 101.

In some embodiments, after S6051, S605 may further include S6052. In S6052, the device for virtualizing a driving environment 1010 analyzes the sensing data transmitted by the second car 102 together with sensing data transmitted by other cars based on the topology to identify sensing data for objects in the driving environment 100. In some embodiments, the other car may include the first car 101.

In some embodiments, after S6052, S605 may further include S6053. In S6053, the device for virtualizing a driving environment 1010 fuses the identified sensing data so as to acquire multiple images for the multiple virtualized objects to construct the scene based on the multiple images and the topology.

Figure 7:
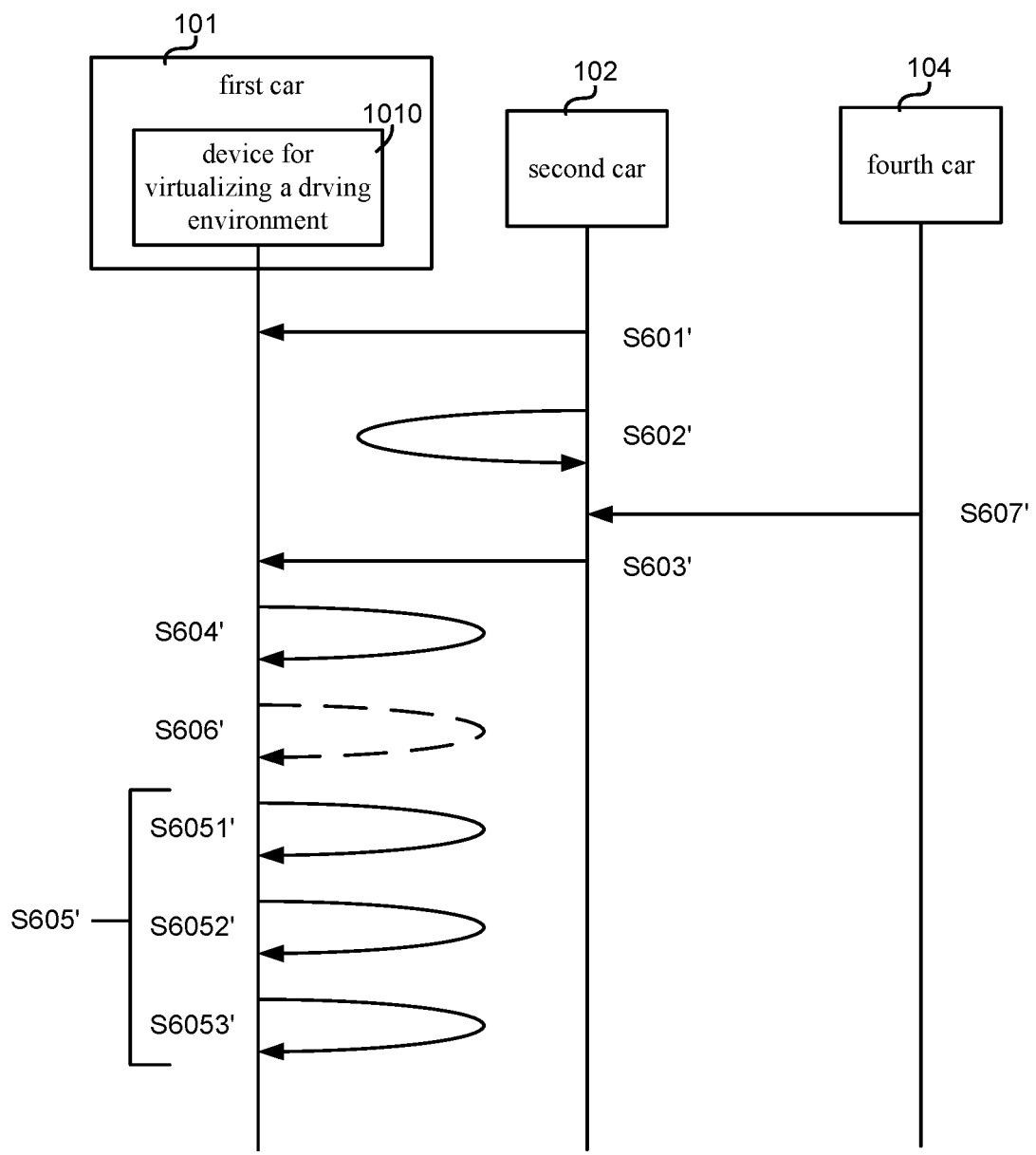
FIG. 7 schematically illustrates a flow diagram for a method for virtualizing a driving environment according to another embodiment in the present disclosure.

FIG. 7 schematically illustrates a flow diagram for a method for virtualizing a driving environment 600' according to another embodiment in the present disclosure.

In S601', the second car 102 transmits position data to the first car 101. Specifically, the position data includes position data of the second car 102 and the fourth car 104.

S602' is equivalent to S602.

In S607', the fourth car 104 transmits compressed sensing data of the fourth car 104 to the second car 102.

In S603', the second car 102 transmits the compressed sensing data of the second car 102 and the fourth car 104 to the first car 101.

In S604', the device for virtualizing a driving environment 1010 mounted on the first car 101 acquires position data of the first car 101, the position data and the sensing data transmitted by the second car 102.

In some embodiments, the method 600 may further include S606', and in S606', the device for virtualizing a driving environment 1010 decompresses the sensing data transmitted by the second car 102.

In S605', the device for virtualizing a driving environment 1010 constructs a scene virtualizing the driving environment 100 based on the position data of the first car 101, the position data and the sensing data transmitted by the second car 102.

In some embodiments, S605' may include S6051' that the device for virtualizing a driving environment 1010 constructs a topology at least including the position coordinate of the second car 102 relative to the position coordinate of the first car 101 and the position coordinate of the fourth car 104 relative to the position coordinate of the first car 101.

In some embodiments, after S6051', S605' may further include S6052'. In S6052', the device for virtualizing a driving environment 1010 analyzes the sensing data transmitted by the second car 102 together with sensing data transmitted by other cars based on the topology to identify sensing data for objects in the driving environment 100.

In some embodiments, after S6052', S605' may further include S6053'. In S6053', the device for virtualizing a driving environment 1010 fuses the identified sensing data so as to acquire multiple images for the multiple virtualized objects to construct the scene based on the multiple images and the topology.

Figure 8:
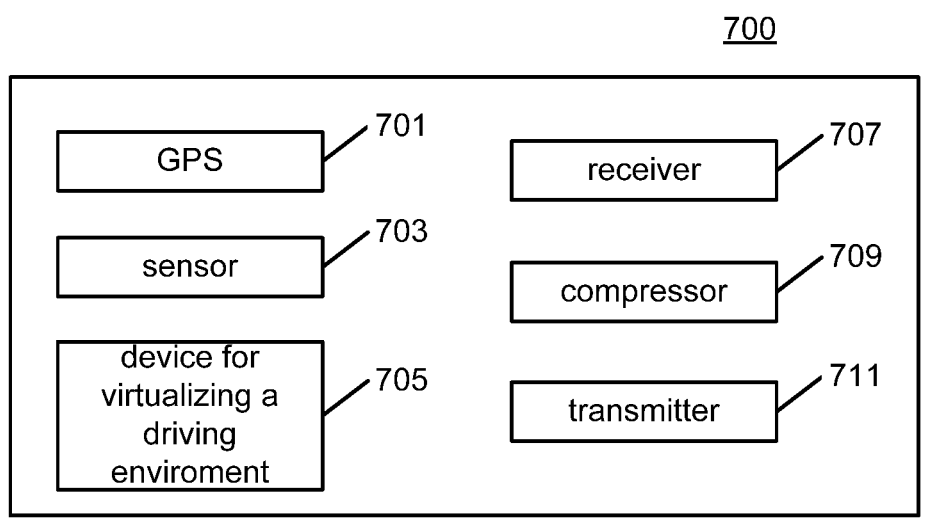
FIG. 8 schematically illustrates a structural diagram for a vehicle according to an embodiment in the present disclosure.

The embodiments of the present disclosure further provide a vehicle. FIG. 8 schematically illustrates a structural diagram for a vehicle 700 according to an embodiment in the present disclosure. The vehicle 700 at least includes a GPS 701, a sensor 703 and a device for virtualizing a driving environment 705.

In some embodiments, the sensor 703 may be a lidar that detects at least one object adjacent to the vehicle 700 for acquiring sensing data for the at least one object.

In some embodiments, the device for virtualizing a driving environment 705 constructs a scene virtualizing a driving environment surrounding the vehicle 700 based on acquired data. In some embodiments, the device for virtualizing a driving environment 705 may be any one of the devices for virtualizing a driving environment described in the previous embodiments.

In some embodiments, the vehicle 700 may further include a receiver 707. In some embodiments, the receiver 707 may receive position data or sensing data from at least one node communicating with the vehicle 700.

In some embodiments, the vehicle 700 may further include a compressor 709 and a transmitter 711.

In some embodiments, the compressor 709 compresses the acquired sensing data for the at least one object. Thus, a reduced network overhead is realized via applying data compression to the sensing data.

In some embodiments, the transmitter 711 transmits the compressed sensing data to the at least one node in response to a request from the at least one node. In some embodiments, the transmitter 711 broadcasts the compressed sensing data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for virtualizing a driving environment surrounding a first node, comprising:
   acquiring position data of the first node, and position data and sensing data of at least one second node, where the at least one second node and the first node are in a first communication network;
   constructing a scene virtualizing the driving environment surrounding the first node based on the position data of the first node and the at least one second node, and on the sensing data of the at least one second node; and
   acquiring position data of at least one third node that is not within the first communication network but is within a second communication network together with a part of the at least one second node,
   wherein the sensing data comprises one or more data sets, each data set of the one or more data sets comprising two position coordinates respectively corresponding with only two ends of a detected-object edge.

2. The method according to claim 1, further comprising: decompressing the sensing data of the at least one second node.

3. The method according to claim 1, wherein constructing a scene virtualizing the driving environment comprises:
   constructing a topology comprising position coordinates of the at least one second node relative to a position coordinate of the first node, based on the position data of the first node and the at least one second node;
   identifying sensing data for objects in the driving environment based on the sensing data of the at least one second node and the topology;
   fusing the identified sensing data to construct the objects; and
   constructing a scene virtualizing the driving environment surrounding the first node based on the constructed objects and the topology.

4. The method according to claim 3, further comprising:
   acquiring sensing data of the first node that contains information of objects adjacent to the first node;
   identifying sensing data for objects in the driving environment based on the sensing data of the first node and the at least one second node;
   fusing the identified sensing data to construct the objects; and
   constructing a scene virtualizing the driving environment surrounding the first node based on the constructed objects and the topology.

5. The method according to claim 3, further comprising:
   constructing the topology to comprise position coordinates of the at least one second node and the at least one third node relative to the position coordinate of the first node, where the position data of the at least one third node is obtained from the part of the at least one second node.

6. The method according to claim 5, further comprising:
   acquiring sensing data of the at least one third node;
   identifying sensing data for objects in the driving environment based on the sensing data of the at least one second node and the at least one third node;
   fusing the identified sensing data to construct the objects; and
   constructing a scene virtualizing the driving environment surrounding the first node based on the constructed objects and the topology.

7. The method according to claim 1, wherein the sensing data is compressed and comprises a node identification and a data set comprising position data, velocity data, size data or shape data for objects detected; or
   wherein the sensing data is compressed, and each data set of the one or more data sets comprises an index of layer of recursive sub-cube division.

8. The method according to claim 1, wherein the position data is acquired based on GPS data transmitted using a basic safety message or a cooperative awareness message.

9. A method for virtualizing a driving environment surrounding a first node, comprising:
   acquiring position data of the first node, and position data and sensing data of at least one second node, where the at least one second node and the first node are in a first communication network;
   constructing a scene virtualizing the driving environment surrounding the first node based on the position data of the first node and the at least one second node, and on the sensing data of the at least one second node; and
   constructing a topology comprising position coordinates of the at least one second node relative to a position coordinate of the first node, based on the position data of the first node and the at least one second node,
   wherein the sensing data comprises one or more data sets, each data set of the one or more data sets comprising an index of layer of recursive sub-cube division.

10. The method according to claim 9, wherein the sensing data of the at least one second node is compressed, and before constructing the scene virtualizing the driving environment, the method further comprises: decompressing the sensing data of the at least one second node.

11. The method according to claim 9, wherein constructing a scene virtualizing the driving environment comprises:
    identifying sensing data for objects in the driving environment based on the sensing data of the at least one second node and the topology;
    fusing the identified sensing data to construct the objects; and
    constructing a scene virtualizing the driving environment surrounding the first node based on the constructed objects and the topology.

12. The method according to claim 9, further comprising: acquiring sensing data of the first node which contains information of objects adjacent to the first node.

13. The method according to claim 12, wherein constructing a scene virtualizing the driving environment comprises:
identifying sensing data for objects in the driving environment based on the sensing data of the first node and the at least one second node;
fusing the identified sensing data to construct the objects; and
constructing a scene virtualizing the driving environment surrounding the first node based on the constructed objects and the topology.

14. The method according to claim 9, further comprising:
acquiring position data of at least one third node that is not within the first communication network but is within a second communication network together with a part of the at least one second node, where the position data of the at least one third node is obtained from the part of the at least one second node.

15. The method according to claim 14, wherein constructing a scene virtualizing the driving environment comprises:
constructing the topology comprising position coordinates of the at least one second node and the at least one third node relative to a position coordinate of the first node based on the position data of the at least one second node and at least one third node.

16. The method according to claim 15, further comprising: acquiring sensing data of the at least one third node.

17. The method according to claim 16, wherein constructing a scene virtualizing the driving environment further comprises:
identifying sensing data for objects in the driving environment based on the sensing data of the at least one second node and the at least one third node;
fusing the identified sensing data to construct the objects; and
constructing a scene virtualizing the driving environment surrounding the first node based on the constructed objects and the topology.

18. The method according to claim 9, wherein the sensing data is compressed and comprises a node identification and a data set comprising position data, velocity data, size data or shape data for objects detected; or
wherein the sensing data is compressed and comprises one or more data sets, each data set of the one or more data sets comprising two position coordinates respectively corresponding with only two ends of a detected-object edge.

19. The method according to claim 9, wherein the position data is acquired based on GPS data transmitted through a basic safety message or a cooperative awareness message.

20. A method for virtualizing a driving environment surrounding a first vehicle, comprising:
obtaining sensing data of objects in the driving environment detected by a sensor mounted on a second vehicle, the sensing data comprising one or more data sets, each data set of the one or more data sets consisting of two position coordinates and an index of layer of recursive sub-cube division, the two position coordinates respectively corresponding with two ends of a detected-object edge;
compressing the sensing data of the objects;
transmitting the compressed sensing data;
acquiring position data of the first vehicle and position data of the second vehicle;
constructing a scene virtualizing the driving environment based on the position data of the first vehicle, the position data of the second vehicle, and the sensing data;
constructing a topology comprising position coordinates of the second vehicle relative to position coordinates of the first vehicle, based on the position data of the first vehicle and the position data of the second vehicle;
identifying sensing data for the objects based on the sensing data and the topology;
fusing the identified sensing data to construct the objects; and
constructing a scene virtualizing the driving environment surrounding the first vehicle based on the constructed objects and the topology.

* * * * *